Figure 1:
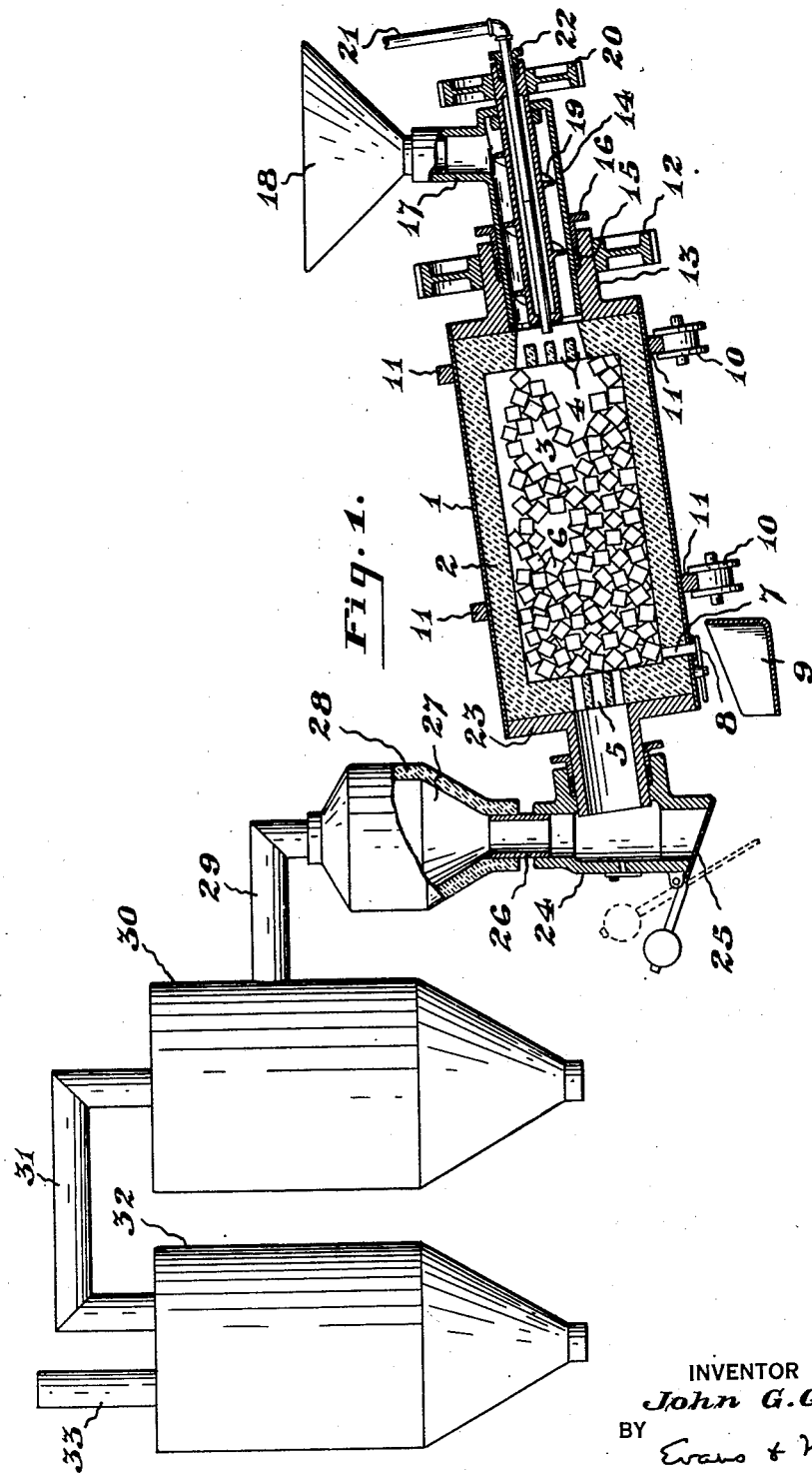

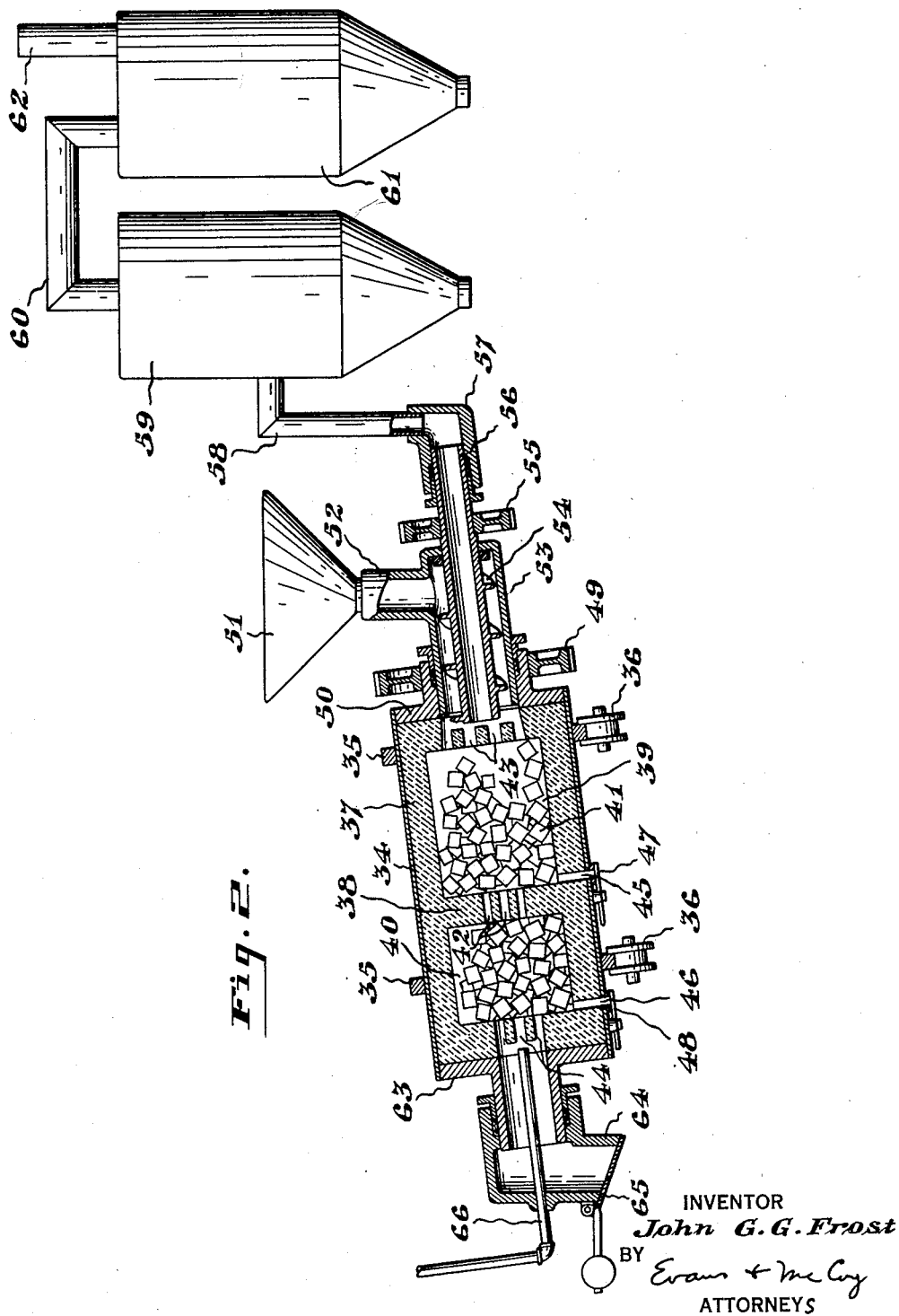

Patented Nov. 13, 1934

1,980,263

UNITED STATES PATENT OFFICE 1,980,263

PROCESS OF SMELTING ALUMINUM

John G. G. Frost, Cleveland, Ohio, assignor to The National Smelting Company, Cleveland, Ohio, a corporation of Ohio Application May 27, 1930, Serial No. 456,181

2 Claims. (Cl. 75—58)

This invention relates to a process for recovering the metallic aluminum content of finely divided material such as borings, turnings, skimmings, dross, and the like, wherein the major portion of such aluminum content is recovered directly in molten form by the utilization of heat from an exothermic reaction.

An object of the invention is to provide an economical process for the recovery of the aluminum content of material containing metallic aluminum in particles of relatively small mass, such as borings, skimmings, and the like. Further objects are to provide such a process wherein the major portion of the aluminum may be recovered directly in molten form and wherein the recovery of aluminum may be continuous.

Other objects of the invention will be apparent to those skilled in the art from the disclosures herein made.

Briefly, my invention contemplates the recovery of aluminum from material containing small particles of metallic aluminum by causing chlorine to react with sufficient proportion, at least five percent, of the aluminum in said material to cause the generation of sufficient heat to melt the remainder of the metallic aluminum in said material, the heat being produced as a result of the exothermic nature of the reaction between aluminum and chlorine. The invention further contemplates the coalescence of the resulting distributed globules of molten aluminum into a body of molten metal which may be readily separated from the residue of solid material. The reaction preferably takes place in a chamber from which the atmosphere is excluded, in order to prevent oxidation of said aluminum. The gaseous aluminum chloride resulting from the reaction between the chlorine and aluminum may be condensed and recovered.

In the drawings,

Figure 1 is a diagrammatic view partly in section of one form of apparatus wherein my invention may be carried out; and Fig. 2 is another diagrammatic view partly in section illustrating a modified form of apparatus which may be used in carrying out my invention.

One form of apparatus in which my invention may be carried out is illustrated diagrammatically in Fig. 1 wherein is shown an inclined rotatable drum 1 having a lining 2 of which the inner portion at least is of refractory material. The lining 2 may include additionally material of insulating nature, such as infusorial earth. The lining 2 is of sufficient heat-insulating nature to maintain the interior of the drum above the melting point of aluminum. The lining 2 encloses a reaction space 3 which is shown as substantially filled with loose brick or equivalent material. The drum 1 is provided with grilled openings 4 and 5 which are arranged to retain the brick 6 within the reaction chamber. A tap hole 7 is provided near the lower end of the drum to permit molten aluminum to be withdrawn periodically. The tap hole is provided with a suitable cover 8 which may be manipulated manually, or automatically by suitable tripping means (not shown). A trough 9 is shown disposed beneath the tap hole to receive molten aluminum and direct the same into any suitable receptacle. The drum 1 is arranged to rotate on rollers 10 cooperating with the trunnions 11 affixed to the drum. The rotation of the drum is accomplished by suitable actuating means cooperating with the gear 12 affixed to the collar 13 shown at the upper end of the drum.

Means for introducing aluminum-containing material and chlorine into the reaction chamber 3 are shown adjacent the upper end of the drum 1. Thus the stationary housing 14 cooperates in gas-tight relation to the collar 13 by means of the packing 15 and gland 16. The housing 14 is shown as provided with an upstanding section 17 and funnel 18. Within the housing 14 a hollow conveyor 19 is arranged to be rotated by the gear 20 and any suitable actuating means. A chlorine tube 21 is arranged to extend through the hollow conveyor 19 into the upper end of the drum. The chlorine tube 21 is secured in gas-tight relation to the conveyor 19 by suitable packing means 22. If desired, the end of the chlorine tube adjacent the reaction space 3 may be made of silica or other heat resisting material.

A collar 23 is secured to the lower end of the drum 1, this collar extending in gas-tight relation into the housing 24, the bottom of which is provided with a trippable cover 25. The housing 24 is secured by means of a member 26 to a condenser 27 which may be provided with an insulating cover 28 to permit of the condensing only of the less volatile undesired reaction products. The condenser 27 is in turn secured by a conductor 29 to a condenser 30, conductor 31, condenser 32, and an outlet pipe or vent 33.

In Fig. 2 I have shown a modified form of apparatus arranged for counter-current flow of chlorine and aluminum-containing material, and further provided with a plurality of reaction chambers and a plurality of tap holes for the removal of molten aluminum. In Fig. 2 there is shown a drum 34 provided with trunnions 35 for rotation on the rollers 36. The drum 34 is provided with an insulating lining 37 and an apertured partition 38 separating the drum into two reaction chambers 39 and 40, each of which chambers is shown as substantially filled with brick 41 or equivalent material. The aperture 42 in the partition 38 and the apertures 43 and 44 in the upper and lower ends of the drum are grilled in order to retain the brick 41 within the respective chambers.

Tap holes 45 and 46 are provided in the chambers 39 and 40, and tap hole covers 47 and 48 are provided on the exterior of the drum, which covers may be operated manually or by any suitable tripping means.

The drum 34 may be rotated by suitable means actuating the gear 49 secured to the collar 50 at the upper end of the drum.

Aluminum-containing material may be introduced into the hopper 51 cooperating with the upstanding extension 52 of the stationary housing 53, which in turn cooperates in gas-tight relation with the upper end of the drum. A hollow conveyor 54 extends through the housing 53 and is arranged to introduce material into the drum 34 at a desired rate by suitable actuation of the gear 55. The extension 56 of the conveyor 54 cooperates with the member 57 and communicates through the hollow conductor 58 with the condenser 59 and through the conductor 60 to condenser 61, a vent or outlet pipe 62 being provided in the condenser 61. The connections of the conveyor 54 with the housing 53 and member 57 are gas-tight in order to prevent air leakage into the drum 34.

A collar 63 is secured to the lower end of the drum and cooperates in gas-tight relation with the discharge housing 64 which is provided with a trippable closure 65. A chlorine conductor tube 66 extends through the housing 64 and into the lower end of the drum 34. The inner end of the conductor tube 66 may be of silica or other heat resisting material.

In carrying out my process in the manner indicated in Fig. 1, material containing metallic aluminum in relatively small particles, such as borings, turnings, skimmings, dross and the like, is charged into the hopper 18 whence it falls into the housing 14 and is conveyed at a desired rate into the rotating drum 1. Chlorine is simultaneously fed to the reaction chamber through the chlorine tube 21. At the commencement of the operation the reaction chamber is preferably heated to at least 200° C. in any suitable manner, in order that the reaction between aluminum and chlorine may proceed at a relatively rapid rate. The proportion of chlorine to the metallic aluminum content of the material being treated is such that at least five percent of the aluminum content will be transformed into aluminum chloride in order that sufficient exothermic heat may be produced from the reaction to maintain the reaction chamber at a temperature above the melting point of aluminum. The proportions of chlorine to aluminum may, of course, be widely varied depending upon the amount of aluminum chloride which may be desired as a by-product.

By reason of the action of the brick 6 the aluminum containing material is thoroughly distributed throughout the reaction space, and fresh surfaces for reaction are exposed. Furthermore, the chlorine is caused to take a tortuous path through the reaction chamber whereby thorough reaction of the chlorine may take place relatively uniformly throughout the reaction chamber in order that the exothermic heat may be uniformly distributed. The brick 6 has a further very important function of producing what may be termed a rubbing action on the molten small particles of aluminum to cause the coalescence thereof into a sufficiently large mass to form a pool of aluminum at the lower end of the drum which may be drained off through a tap hole 7 at desired intervals. Depending upon the particular circumstances, the molten aluminum thus drawn off may be cast directly, formed into ingots, or alloyed with other materials.

The residual material from the reaction passes out of the drum through the lower end thereof, and may be removed and suitably disposed of through the discharge chamber 24.

Since the aluminum-containing material to be treated frequently contains such impurities as tin, lead, iron and other metals, there will frequently be formed besides gaseous aluminum chloride the chlorides of the aforementioned impurities. The chlorides of the common impurities are usually less volatile than aluminum chloride. The chlorides formed by the reaction, gaseous at the temperature of the reaction chamber, pass outwardly through the lower end of the reaction chamber up into the condenser 27 wherein the less volatile products such as lead and copper chlorides may be condensed and removed through the lower discharge chamber 24. The remaining products, such as aluminum chloride and iron chloride, may pass successively through the condensers 30 and 32, whereby the iron chloride is first condensed and the pure aluminum chloride may be recovered in the second condenser 32, any remaining uncondensed products passing out of the system through the discharge pipe 32, the condensed chlorides being removed from the condensers 30 and 32 through the lower ends thereof.

The manner of carrying out my process with the apparatus shown in Fig. 2 differs from that described with reference to Fig. 1 mainly in that the counter-current flow of materials is employed. The aluminum-containing material is disposed in the hopper 51 and is fed by the hollow conveyor 54 into the reaction chamber 39 at the upper end of the drum 34. The chlorine is fed through the tube 66 into the reaction chamber 40 of the drum 34. In this manner the fresh chlorine reacts with the most nearly exhausted aluminum-containing material, and the fresher aluminum-containing material reacts with the more nearly exhausted chlorine, whereby the reaction may be somewhat more efficiently carried out. The reaction space is divided into upper and lower chambers 39 and 40, and the molten aluminum formed in each one is separately drawn off through the tap holes 45 and 46. The gaseous products of reaction, namely, aluminum chloride and the chlorides of impurities, pass out of the upper end of the reaction chamber through the hollow conveyor 54 and into the condensers 59 and 61. In this case, it will be noted that I have omitted an insulated first condenser, as shown in Fig. 1. Where the composition of the aluminum-containing material to be treated is such that few low volatile gaseous impurities are formed, the insulated first condenser may be omitted.

The residue from the aluminum-containing material passes out of the lower end of the drum and may be removed through the discharge housing 64.

It will be seen that I have provided an improved process whereby the major portion of the aluminum content of aluminum-containing material may be recovered in the form of molten aluminum, and the remainder of the aluminum recovered in the form of a valuable by-product.

It will further be noted that I have provided an economical and advantageous process of recovering aluminum in molten form and which process provides its own heat for the carrying on thereof.

It will also be seen that my improved process permits of the ready treatment of material containing aluminum in relatively small particles whereby the aluminum content of such material may be melted and coalesced into a body of molten aluminum with the attendant advantages resulting from this direct recovery of the aluminum in molten form.

Furthermore, it is to be understood that the particular process shown and described is presented for purposes of explanation and illustration, and that various modications of said process can be made without departing from my invention as defined in the appended claims.

What I claim is:

1. A continuous process of producing aluminum chloride and recovering metallic aluminum from finely divided material containing aluminum, which consists in simultaneously feeding chlorine and the finely divided material into a rotating drum containing loose blocks of refractory material, conducting gaseous aluminum chloride from the interior of the drum, and draining molten aluminum from the rotating drum.

2. A continuous process of producing aluminum chloride and recovering metallic aluminum from material containing aluminum, which consists in feeding the material into a rotating drum and dispersing the material in the space within the drum, simultaneously feeding chlorine into the drum at a rate so regulated with respect to the rate of feed of said material that the chlorine reacts with a portion only of the aluminum to produce aluminum chloride, utilizing the exothermic heat of the reaction between the chlorine and aluminum to volatilize the aluminum chloride and melt aluminum not reacting with the chlorine, collecting and condensing the gaseous aluminum chloride, and withdrawing molten aluminum from the drum while the said material and chlorine are being fed into the drum.

JOHN G. G. FROST.